No. 734,629. PATENTED JULY 28, 1903.
J. E. SPENCER.
AXLE.
APPLICATION FILED FEB. 9, 1903.
NO MODEL.

WITNESSES:
H. A. Lamb.
S. J. Chaffee

INVENTOR
John E. Spencer
BY Geo. D. Phillips.
his ATTORNEY

No. 734,629.

Patented July 28, 1903.

UNITED STATES PATENT OFFICE.

JOHN E. SPENCER, OF MOODUS, CONNECTICUT.

AXLE.

SPECIFICATION forming part of Letters Patent No. 734,629, dated July 28, 1903.

Application filed February 9, 1903. Serial No. 142,553. (No model.)

*To all whom it may concern:*

Be it known that I, JOHN E. SPENCER, a citizen of the United States, and a resident of Moodus, in the county of Middlesex and State of Connecticut, have invented certain new and useful Improvements in Axles, of which the following is a specification.

My invention relates to an improvement in axles; and it consists in certain details of construction pertaining to the axle-nut, manner of locking the same, and convenience of introducing lubricant into a self-oiling axle.

To enable others to understand my invention, reference is had to the accompanying drawings, in which—

Figure 1:
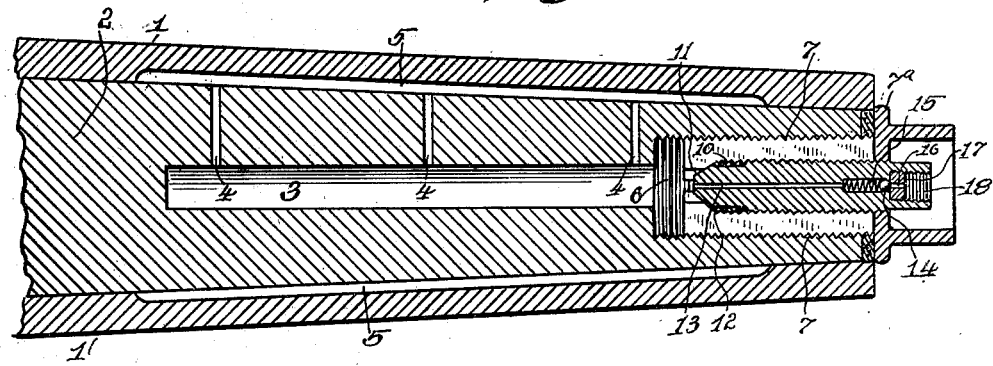
Figure 2:
Figure 3:
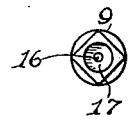
Figure 5:
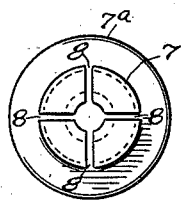
Figure 4:
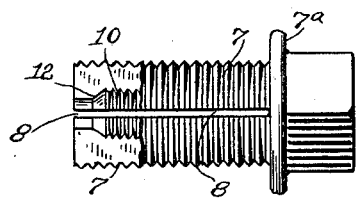

Figure 1 represents a broken sectional view of an axle, axle-box, sectional view of my improved split nut, and tightening-screw. Fig. 2 is a detail view of the tightening-screw. Fig. 3 is a detail front end elevation of the screw. Fig. 4 is a detail broken view of the axle-nut. Fig. 5 is a detail end elevation of the axle-nut.

Its construction and operation are as follows:

1 represents the axle-box; 2, the axle; 3, an oil-reservoir of the axle, and 4 represents oil holes or passages leading from said reservoir to the oil-chamber 5 of the axle-box. 6 is an enlarged threaded hole or recess in the end of the axle to receive the axle-nut 7. This nut (see Figs. 4 and 5) is provided with the four kerfs 8, which extend to the collar 7ª. This enables the threaded portion of the nut to be expanded outwardly against the threaded walls of the recess 6, and thus prevent the said nut working back. This expanding is effected by means of the screw shown at Figs. 1 and 2, whose threaded portion 9 enters the threaded hole 10 of the axle-nut. The tapered end 11 of this screw engaging the tapered seat 12 of the axle-nut will force out or expand the divided sections of said nut when it has been properly adjusted with respect to the axle-box.

While my improved nut is adapted to any kind of axle, so far as regards its expansible feature, I have constructed it also with a view to its use in connection with a self-oiling axle. For this purpose the expanding-screw has the longitudinal oil-passage 13 extending therethrough and enlarged at the outer end to receive the ball 14 and spring 15, adapted to normally close the oil-passage 16 (see also Fig. 3) in the screw-plug 17, located at the bottom of the threaded recess 18 of the said expanding-screw. With this arrangement the chamber 3 of the axle can be filled with oil as often as may be required by simply inserting the threaded end of an oil-pump into the threaded recess 18 of the screw and forcing the oil into said chamber without jacking up the wheel of the vehicle. This is a very important and economical arrangement for heavy trucks, which frequently have to be oiled on the road.

I wish it distinctly understood that I do not broadly claim a self-oiling axle—that is, an axle having a central oil-recess combined with a chambered axle-box and means whereby the oil from said recess flows into said chamber and onto the exterior of the axle, substantially as shown, as this is an old and well-known arrangement. The gist of my invention resides in the expanding-nut and its screw and the arrangement whereby the oil can be forced into the oil-recess of the axle without disturbing the axle-nut or its expanding-screw or jacking up the vehicle-wheel.

Having thus described my invention, what I claim as new, and desire to secure by Letters Patent, is—

1. The combination, with an axle having a threaded recess in its outer end, of a split axle-nut adapted to enter said threaded recess, said nut having a longitudinal bore extending therethrough, said bore having an enlarged threaded portion extending within a short distance from the end of said nut, and a tapered wall at the bottom of said threaded portion, an expanding-screw for said threaded portion, said screw having a tapered end adapted to engage the tapered end wall of the nut and expand the same against the threaded walls of the recess in the end of the axle, said axle having an oil-reservoir opening into said threaded recess, an axle-box surrounding said axle and provided with an oil-chamber opening into said reservoir, said axle being provided with means for conveying oil from said oil-reservoir to the axle-box.

2. In a self-oiling axle, the combination, with the axle having an oil-reservoir, and an enlarged threaded mouth, and the box having an oil-chamber, oil-passages between said chamber and reservoir of a split axle-nut adapted to enter said threaded mouth, said nut having a longitudinal bore therethrough, said bore having an enlarged threaded portion extending within a short distance from the end of said nut, and a tapered end wall at the bottom of said threaded portion, an expanding-screw adapted to engage said threaded portion of the nut, said screw having a tapered end to engage the tapered end wall of the nut to expand the same, said screw having a longitudinal oil-passage therethrough, through which passage oil is adapted to be forced into the oil-reservoir of the axle, a valve in said screw to prevent the outward flow of oil, substantially as shown and described.

Signed at Bridgeport, in the county of Fairfield and State of Connecticut, this 26th day of January, A. D. 1903.

JOHN E. SPENCER.

Witnesses:
GEO. W. FINN,
A. K. LOVELL.